(12) United States Patent
Philippov et al.

(10) Patent No.: US 10,255,240 B2
(45) Date of Patent: Apr. 9, 2019

(54) METHOD AND SYSTEM FOR PROCESSING A VOICE-BASED USER-INPUT

(71) Applicant: YANDEX EUROPE AG, Lucerne (CH)

(72) Inventors: Denis Sergeevich Philippov, Moscow (RU); Evgeny Mikhailovich Volkov, Moscow (RU); Ilia Alekseevich Melnikov, Reutov (RU); Tatiana Mikhailovna Lando, Saint-Petersburg (RU)

(73) Assignee: Yandex Europe AG, Luzern (CH)

( * ) Notice: Subject to any disclaimer, the term of this patent is extended or adjusted under 35 U.S.C. 154(b) by 513 days.

(21) Appl. No.: 15/108,594

(22) PCT Filed: Oct. 7, 2014

(86) PCT No.: PCT/IB2014/065123
§ 371 (c)(1),
(2) Date: Jun. 28, 2016

(87) PCT Pub. No.: WO2015/145224
PCT Pub. Date: Oct. 1, 2015

(65) Prior Publication Data
US 2016/0321266 A1     Nov. 3, 2016

(30) Foreign Application Priority Data

Mar. 27, 2014 (RU) ................................ 2014111627

(51) Int. Cl.
*G06F 16/00* (2019.01)
*G06F 16/30* (2019.01)
(Continued)

(52) U.S. Cl.
CPC ........ *G06F 16/24578* (2019.01); *G06F 3/167* (2013.01); *G06F 16/248* (2019.01);
(Continued)

(58) Field of Classification Search
CPC .......... G06F 16/00; G06F 16/30; G06F 16/90; G06F 3/167; G10L 2015/223;
(Continued)

(56) References Cited

U.S. PATENT DOCUMENTS 7,243,102 B1    7/2007   Naam et al.
8,065,316 B1   11/2011   Baker et al.
(Continued)

FOREIGN PATENT DOCUMENTS

CA   2321665 A1   9/1999
EP   2273491 A1   1/2011
(Continued)

OTHER PUBLICATIONS

Supplemenatry European Search Report for EP 14886945, dated Feb. 19, 2018, Stefan Ziegler.
(Continued)

*Primary Examiner* — Cheryl Lewis
(74) *Attorney, Agent, or Firm* — BCF LLP

(57) ABSTRACT

There is disclosed a method of processing a search query, the method executable at a server. The method comprises receiving, via a communication network from an electronic device associated with the user, a first voice command from the user, the first voice command comprising an indication of a first search query; receiving, via the communication network from the electronic device associated with the user, a second voice command from the user, the second voice command comprising an indication of a second search query; determining if the second search query is a refinement of the first search query, said determining comprising; performing a first pseudo search based on a combination of the first search query and the second search query; performing a second pseudo search including the second search query; determining relative weight of the first pseudo search (Continued)

results and the second pseudo search results; deducing that the second search query is a refinement of the first search query responsive to the relative weight of the first pseudo search results being higher than that of the second pseudo search results.

20 Claims, 3 Drawing Sheets

(51) Int. Cl.
    *G06F 16/90*     (2019.01)
    *G06F 16/2457*     (2019.01)
    *G06F 16/248*     (2019.01)
    *G06F 16/242*     (2019.01)
    *G06F 3/16*     (2006.01)
    *G06F 17/30*     (2006.01)
    *G10L 15/22*     (2006.01)

(52) U.S. Cl.
    CPC ...... *G06F 16/2425* (2019.01); *G06F 17/3053* (2013.01); *G06F 17/30395* (2013.01); *G06F 17/30554* (2013.01); *G06F 17/30646* (2013.01); *G10L 15/22* (2013.01); *G10L 2015/223* (2013.01)

(58) Field of Classification Search
    CPC ..... Y10S 707/99933; Y10S 707/99934; Y10S 707/99935; Y10S 707/99943; Y10S 707/99948
    See application file for complete search history.

(56) References Cited

U.S. PATENT DOCUMENTS

| | | | |
|---|---|---|---|
| 8,249,876 B1 | 8/2012 | Ainslie | |
| 8,260,809 B2 | 9/2012 | Platt et al. | |
| 8,484,190 B1 | 7/2013 | Igarashi et al. | |
| 8,515,752 B1 | 8/2013 | Franz et al. | |
| 9,110,993 B1* | 8/2015 | Shattuck | G06F 17/30864 |
| 2005/0055341 A1 | 3/2005 | Haahr et al. | |
| 2007/0150286 A1 | 6/2007 | Miller et al. | |
| 2008/0077563 A1 | 3/2008 | Parikh | |
| 2009/0006345 A1 | 1/2009 | Platt et al. | |
| 2010/0318551 A1 | 12/2010 | Lai | |
| 2011/0029311 A1 | 2/2011 | Minamino et al. | |
| 2013/0326353 A1 | 12/2013 | Singhal | |
| 2015/0161239 A1* | 6/2015 | Stepinski | G06F 17/30 707/765 |
| 2017/0220680 A1* | 8/2017 | Shattuck | G06F 17/30864 |

FOREIGN PATENT DOCUMENTS

| | | |
|---|---|---|
| RU | 2419858 C2 | 5/2011 |
| WO | 2008083172 A2 | 7/2008 |
| WO | 2010077803 A2 | 7/2010 |
| WO | 2011017558 A1 | 2/2011 |
| WO | 2012033820 A2 | 3/2012 |
| WO | 2013091415 A1 | 6/2013 |
| WO | 2013130633 A1 | 9/2013 |

OTHER PUBLICATIONS

Xuehua et al, Implicit user modeling for personalized search, Proceedings of the 14th International Conference on Information and Knowledge Management, CIKM 2005, Bremen Germany, Oct. 31-Nov. 5, 2005.

International Search Report of PCT/IB2014/065123; Blaine R. Copenheaver; dated Feb. 20, 2015.

* cited by examiner

METHOD AND SYSTEM FOR PROCESSING A VOICE-BASED USER-INPUT

CROSS-REFERENCE

The present application claims convention priority to Russian Patent Application No. 2014111627, filed Mar. 27, 2014, entitled "A METHOD AND A SYSTEM FOR PROCESSING A VOICE-BASED USER-INPUT" which is incorporated by reference herein in its entirety.

FIELD

The present technology relates to methods of conducting searches in general and specifically to a method and a system for processing a voice-based user-input.

BACKGROUND

A typical user has a multitude of communication devices available to him for accessing the Internet to potentially satisfy various needs for information or content. These communication devices include (but are not limited to) desktops, laptops, smartphones, tablets, just to name a few. Each of these devices is associated with a user interface for enabling the user to input information into the communication device and to receive the information from the communication device.

For example, a laptop may be associated with a keyboard and a track tablet to enable the user to input information into the laptop and a screen to enable the user to obtain information from the laptop. By the same token, a typical tablet may have a unified input/output interface, such as a touchscreen. The touchscreen typically provides the user with a virtual keyboard to enable the user to input information into the tablet by touching a respective area on the touchscreen. The touchscreen is also used to output information to the user. Some smartphones also use the touchscreen as means for input and output of information by/to the user. Some smartphones have both the physical keyboard and a touchscreen to provide the user a choice of means to enter the information into the smartphone.

There can be numerous circumstances when it is not convenient for the user to use the typical input/output means. For example, when the user is driving and is desirous of interacting with his smartphone, using the touchscreen may not be the most convenient (or even the safest) mode of interacting with the smartphone. As such, several technologies for voice entry and output of information have been proposed. For example, it is known to implement a solution, where the user can interact with the communication device using voice (i.e. spoken) commands. The electronic device then performs a speech to text recognition and executes the user command.

For example, the user may say: "Shuffle all songs" to his iPhone™ smartphone (using the SIRI™ application. Responsive to the receipt of such a command, the smartphone is operable to play music stored therein in a random manner (i.e. to randomly select songs or "shuffle" the available songs). It is also known for a given electronic device to output information via a synthesized voice interface. For example, it is known for the given electronic device to execute a text to speech conversion, to "read out" a content of an e-mail (or another electronic document) to the user.

Some solutions enable the user to fully interact with the electronic device using voice. For example, the Siri™ application for iPhone™ smartphone enables the user to interact with several applications of the smartphone using voice. For example, upon user activating the Siri application, the smartphone is entered into a "listening" mode, where the application is awaiting a voice-based command from the user. Some of the known interactions may include the following examples.

A given user may have entered a voice-command: "Set an appointment for 11:30 am". Responsive to such a command, the Siri application responds by uttering using a synthetic voice: "I will set up an appointment for tomorrow at 11:30 am. Shall I schedule it?" The user can then confirm the appointment and the application will create an entry into the Calendar application for 11:30 am.

Another user may have entered a voice-command: "When is my next meeting?" Responsive to this voice-command, the application provides a voice-response: "Your next meeting is at 14:30 today".

Voice recognition based interfaces provide a multitude of problems that the industry has tried to solve—some to a better degree than the others. For example, managing ambient noise is one of the concerns when performing voice recognition. Another concern is dealing with each user's accent, especially without proper "machine training" routines traditionally used on desktop applications and not used on mobile applications.

SUMMARY

It is an object of the present technology to ameliorate at least some of the inconveniences present in the prior art.

Embodiments of the present technology have been developed based on inventors' recognition of at least one problems/needs associated with the prior art solutions of voice-based user interfaces. Specifically, when a user interacts with a search engine using voice command, it may be challenging for the search engine to determine if the user's utterance is a refinement of a previous search query or a completely new search query.

Accordingly, according to embodiments of the present technology, there is provided a method of processing a search query. The method can be executable at a server. The method comprising: receiving, via a communication network from an electronic device associated with the user, a first voice command from the user, the first voice command comprising an indication of a first search query; receiving, via the communication network from the electronic device associated with the user, a second voice command from the user, the second voice command comprising an indication of a second search query; determining if the second search query is a refinement of the first search query, the determining comprising: performing a first pseudo search based on a combination of the first search query and the second search query; performing a second pseudo search including the second search query; determining relative weight of the first pseudo search results and the second pseudo search results; deducing that the second search query is a refinement of the first search query responsive to the relative weight of the first pseudo search results being higher than that of the second pseudo search results.

In some implementations, the method further comprises, responsive to receiving the first voice command, performing a search based on the first search query and transmitting, via the communication network, a SERP responsive to the first search query to the electronic device associated with the user.

In some implementations of the method, the transmitting comprises transmitting an instruction to the electronic device, the instruction being instrumental for causing the electronic device to display a widget associated with at least one search result within the SERP.

In some implementations, the widget comprises at least one interactive element for establishing a two-way communication between the widget being displayed on the electronic device and a resource associated with the at least one search result.

In some implementations, the second search query is based on at least a portion of the at least one interactive element.

In some implementations, the second search query is for populating at least a portion of the at least one interactive element.

In some implementations, responsive to deducing that the second search query is a refinement of the first search query, the method further comprises transmitting a trigger to the electronic device, the trigger being instrumental in causing the electronic device to update at least one interactive element with at least a portion of the second search query.

In some implementations, the trigger is being further instrumental in causing the electronic device to update a portion of the widget with information responsive to the combined search including the first search query and the second search query.

In some implementations, the trigger is being further instrumental in causing the electronic device to update a portion of the widget with information responsive to the combined search including the first search query and the second search query, upon user providing an instruction to do so.

In some implementations, the trigger is being further instrumental in causing the electronic device to present the user a web site associated with the resource associated with the at least one search result, the resource being updated with information responsive to the combined search including the first search query and the second search query.

In some implementations, the trigger is being further instrumental in causing the electronic device to present the user a web site associated with the resource associated with the at least one search result, the resource being updated with information responsive to the combined search including the first search query and the second search query, upon user providing an instruction to do so.

In some implementations, responsive to deducing that the second search query is a refinement of the first search query, the method further comprises transmitting to the electronic device, via the communication network, an updated SERP, the updated SERP being responsive to the first pseudo search.

In some implementations, the method further comprises transmitting to the electronic device a trigger instrumental in causing the communication device to only display the updated SERP in response to receiving an instruction from the user to do so.

In some implementations, the receiving of the first voice command is executed upon user providing to the electronic device a voice command interface activation command.

In some implementations, the method further comprises receiving, via the communication network from the electronic device associated with the user, a third voice command from the user, the third voice command comprising an indication of a third search query; and the method further comprising deducing if the third search query is a refinement of the first search query and the second search query.

In some implementations, the determining if the second search query is a refinement of the first search query comprises applying a ranking algorithm.

In some implementations, the ranking algorithm is a machine-learning algorithm used for ranking search results for generating a SERP.

According to another broad aspect of the present technology, there is provided a server for processing a search query. The server comprises a network communication interface for a two-way communication over a communication network and a processor coupled to the network communication interface. The processor is configured to receive, via the network communication interface from an electronic device associated with the user, a first voice command from the user, the first voice command comprising an indication of a first search query; receive, via the network communication interface from the electronic device associated with the user, a second voice command from the user, the second voice command comprising an indication of a second search query; determine if the second search query is a refinement of the first search query by executing the steps of: performing a first pseudo search based on a combination of the first search query and the second search query; performing a second pseudo search including the second search query; determining relative weight of the first pseudo search results and the second pseudo search results; deducing that the second search query is a refinement of the first search query responsive to the relative weight of the first pseudo search results being higher than that of the second pseudo search results.

In some implementations, the processor is further configured, responsive to the receipt of the first voice command, to perform a search based on the first search query and to transmit, via the network communication interface, a SERP responsive to the first search query to the electronic device associated with the user.

In some implementations, to transmit, the processor is configured to transmitting an instruction to the electronic device, the instruction being instrumental for causing the electronic device to display a widget associated with at least one search result within the SERP.

In some implementations, the widget comprises at least one interactive element for establishing a two-way communication between the widget being displayed on the electronic device and a resource associated with the at least one search result.

In some implementations, the second search query is based on at least a portion of the at least one interactive element.

In some implementations, the second search query is for populating at least a portion of the at least one interactive element.

In some implementations, responsive to deducing that the second search query is a refinement of the first search query, the processor is further configured to transmit a trigger to the electronic device, the trigger being instrumental in causing the electronic device to update at least one interactive element with at least a portion of the second search query.

In some implementations, the trigger is being further instrumental in causing the electronic device to update a portion of the widget with information responsive to the combined search including the first search query and the second search query.

In some implementations, the trigger is being further instrumental in causing the electronic device to update a portion of the widget with information responsive to the combined search including the first search query and the second search query, upon user providing an instruction to do so.

In some implementations, the trigger is being further instrumental in causing the electronic device to present the user a web site associated with the resource associated with the at least one search result, the resource being updated with information responsive to the combined search including the first search query and the second search query.

In some implementations, the trigger is being further instrumental in causing the electronic device to present the user a web site associated with the resource associated with the at least one search result, the resource being updated with information responsive to the combined search including the first search query and the second search query, upon user providing an instruction to do so.

In some implementations, responsive to deducing that the second search query is a refinement of the first search query, the processor is further configured to transmit to the electronic device, via network communication interface, an updated SERP, the updated SERP being responsive to the first pseudo search.

In some implementations, the processor is further configured to transmit to the electronic device a trigger instrumental in causing the communication device to only display the updated SERP in response to receiving an instruction from the user to do so.

In some implementations, the processor only receives the first voice command upon user providing to the electronic device a voice command interface activation command.

In some implementations, the processor is further configured to receive, via the network communication interface from the electronic device associated with the user, a third voice command from the user, the third voice command comprising an indication of a third search query; and the processor is further configured to deduce if the third search query is a refinement of the first search query and the second search query.

In some implementations, to determine if the second search query is a refinement of the first search query, the processor is configured to apply a ranking algorithm.

In some implementations, the ranking algorithm is a machine-learning algorithm used for ranking search results for generating a SERP.

According to another broad aspect of the present technology, there is provided a non-transient computer readable medium comprising computer executable instructions, which instructions when executed are configured to cause a processor of a server to execute: receiving, via a communication network from an electronic device associated with the user, a first voice command from the user, the first voice command comprising an indication of a first search query; receiving, via the communication network from the electronic device associated with the user, a second voice command from the user, the second voice command comprising an indication of a second search query; determining if the second search query is a refinement of the first search query, said determining comprising: performing a first pseudo search based on a combination of the first search query and the second search query; performing a second pseudo search including the second search query; determining relative weight of the first pseudo search results and the second pseudo search results; deducing that the second search query is a refinement of the first search query responsive to the relative weight of the first pseudo search results being higher than that of the second pseudo search results.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
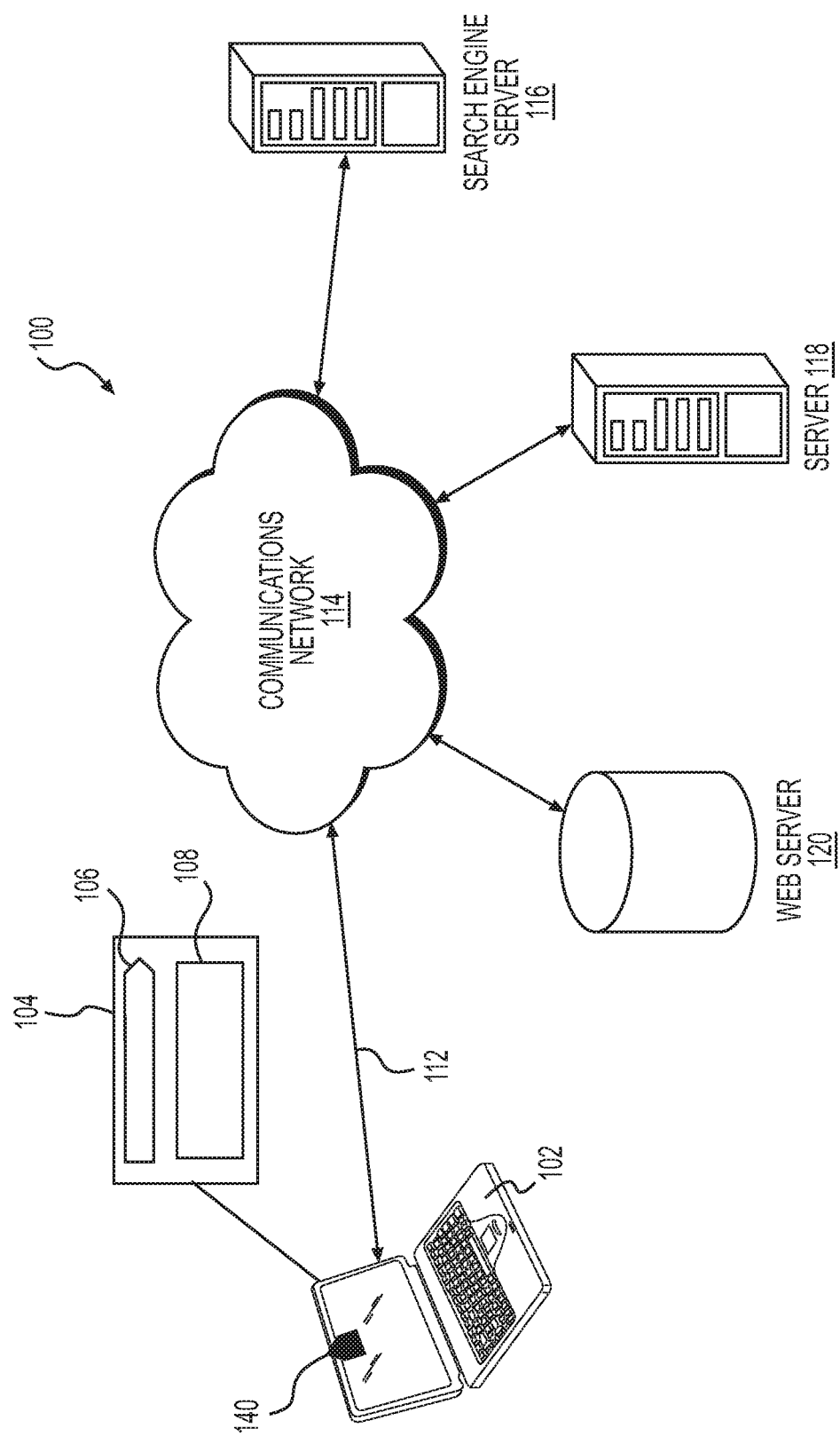
FIG. 1 depicts a system 100 configured to implement various embodiments of the present technology.

With reference to FIG. 1, there is depicted a system 100, the system implemented according to embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless communication device (a cell phone, a smartphone, a tablet and the like), as well as network equipment (a router, a switch, or a gateway). Within the depiction of FIG. 1, the electronic device 102 is implemented as the personal computer (desk top).

The electronic device 102 comprises hardware and/or software and/or firmware (or a combination thereof), as is known in the art, to execute a search application 104. Generally speaking, the purpose of the search application 104 is to enable the user (not depicted) to execute a search, such as the above mentioned web search using the above-mentioned search engine.

How the search application 104 is implemented is not particularly limited. One example of the search application 104 may be embodied in a user accessing a web site associated with a search engine to access the search application 104. For example, the search application can be accessed by typing in an URL associated with Yandex search engine at www.yandex.ru. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited) to those implementations, where the electronic device 102 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

The browser application 104 has a command interface 106 and the browsing interface 108, both of which are empty as the user has not yet started inputting any web resource addresses. In some embodiments of the present technology, the command interface 106 can be implemented as an "omnibox" field—the one incorporating functionality of the field for entering URLs and the field for entering search queries for the search engine to search. In other words, the user can use the command interface 106 for both entering search queries and URLs. The browsing interface 108 is for displaying to the user either (i) a web resource associated with the URL entered into the command interface 106 or (ii) a search results page (SERP) generated in response to the search query entered in the command interface 106. Naturally, in other embodiments of the present technology, the command interface 106 can be dedicated to the user entering URLs, while a separate query interface (not depicted) can be provided to the user to enable the user to enter search queries.

The electronic device 102 is coupled to a communications network 114 via a communication link 112. In some non-limiting embodiments of the present technology, the communications network 114 can be implemented as the Internet. In other embodiments of the present technology, the communications network 114 can be implemented differently, such as any wide-area communications network, local-area communications network, a private communications network and the like.

How the communication link 112 is implemented is not particularly limited and will depend on how the communication device 102 is implemented. Merely as an example and not as a limitation, in those embodiments of the present technology where the electronic device 102 is implemented as a wireless communication device (such as a smart-phone), the communicated link 102 can be implemented as a wireless communication link (such as but not limited to, a 3G communications network link, a 4G communications network link, a Wireless Fidelity, or WiFi® for short, Bluetooth® and the like). In those examples, where the communication device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 112 and the communications network 114 are provided for illustration purposes only. As such, those skilled in the art will easily appreciate other specific implementational details for the electronic device 102, the communication link 112 and the communications network 114. As such, by no means, examples provided herein above are meant to limit the scope of the present technology.

Also coupled to the communications network is a search engine server 116. The search engine server 116 can be implemented as a conventional computer server. In an example of an embodiment of the present technology, the search engine server 116 can be implemented as a Dell™ PowerEdge™ Server running the Microsoft™ Windows Server™ operating system. Needless to say, the search engine server 116 can be implemented in any other suitable hardware and/or software and/or firmware or a combination thereof. In the depicted non-limiting embodiment of present technology, the search engine server 116 is a single server. In alternative non-limiting embodiments of the present technology, the functionality of the search engine server 116 may be distributed and may be implemented via multiple servers.

In some embodiments of the present technology, the search engine server 116 is under control and/or management of a search engine provider, such as, for example, an operator of the Yandex™ search engine. As such, the search engine server 116 may be configured to execute one or more searches responsive to the search query entered by the user into the command interface 105. The search engine server 116 is also configured to transmit to the electronic device 102 a set of search results, for the set of search results to be displayed to the user via the browsing interface 108. These functions are well known in the art and will not be described here at any length.

Also coupled to the communications network 114 is a server 118. In some embodiments of the present technology, the server 118 is implemented as a voice-command management server. It should be noted that even though the server 118 and the search engine server 116 are depicted as separate physical entities, they can be implemented in a single server and, as such, functionality of the server 118 described below can be implemented as part of functionality of the search engine server 116. By the same token, the functionality of one or both of the server 118 and the search engine server 116 can be implemented in s distributed manner.

The implementations of the search engine server 116 and the server 118 are well known in the art. So, suffice it to state, that each of the search engine server 116 and the server comprises inter alfa a network communication interface (such as a modem, a network card and the like) for two-way communication over the communications network 114; and a processor coupled to the network communication interface, the processor being configured to execute various routines, including those described herein below. To that end the processor may store or have access to computer readable instructions which instructions, when executed, cause the processor to execute the various routines described herein.

Also coupled to the communications network 114 is a web server 120. Generally speaking, the web server 120 can host one or more resources available to the electronic device 102 via the communications network 114. For example, the web server 120 can host one or more web sites accessible by the electronic device 102 via the communications network 114 upon user typing the URL associated with the one or more web sites into the search query interface 204. Alternatively, an indication of the one or more web sites can be provided by the search engine server 116 as part of the search results page (SERP) responsive to the user query submitted via the search query interface 204. For the purposes of the illustration to be presented herein below, it will be assumed that one of the resources hosted by the web server 120 is a web resource dedicated to selling cheap vacations and airline tickers. It shall also be assumed that the web resource is associated with URL "www.cheaptrip.ru". It should be expressly understood that embodiments of the present technology are not limited to any specific implementation of the web resource.

According to embodiments of the present technology, the electronic device 102 is configured to execute a voice interface routine 140. Generally speaking, the voice interface routine 140 can be implemented as a software application. The voice interface routine 140 can be configured to accept voice-based user-input and to execute one or more actions based on the voice-based user-input. In some embodiments of the present technology, the voice interface routine 140 is configured to receive a first voice command via a built-in microphone (not depicted) associated with the electronic device 102. Needless to say, that the electronic device 102 may not be associated with the build-in microphone and, as such, the voice interface routine 140 may receive the first voice command using a separate microphone (not depicted) coupled to the electronic device 102.

For the purposes of this description and as an example only, it shall be assumed that the first voice command comprises a search query "Search cheap tickets . . . ". In some embodiments of the present technology, prior to receipt of the first voice command, the voice interface routine 140 may require receipt of an activation command. Specific implementation of the activation command is not particularly limited and may include (but is not limited to) utterances such as: "Voice On", "Listen", "Perform a search", "Accept my search query", etc.

In some embodiments, the receipt of the activation command, in a sense, activates the voice activation routine 140 into a listen mode. Alternatively, the voice interface routine 140 can be implemented in an "always on" mode or, in other words, the voice interface routine 140 can be configured to monitor for a voice command from the user as long as the electronic device 102 is on and the user has not otherwise disabled the voice interface routine 140.

Upon receipt of the first voice command, the voice interface routine 140 is configured to trigger execution of a search based on the search query contained in the voice interface routine 140. In some embodiments of the present technology, the voice interface routine 140 may be configured to trigger execution of the search application 104 (unless the electronic device 102 already has an instance of the search application 104 running) For example, the search application 104 can open a new window executing of the search application 104 or a new tab on the already-operating instance of the search application 104.

Next, the search application 104 is configured to execute a speech to text recognition routine to translate the utterance of the first voice command into a machine-readable format. In some embodiments, the voice interface routine 140 can execute the following routine to recognize the voice command:

```
<yari>
    <speech>
        <text conf="..."><{translated text}</text>
        ...
        <text conf="...">{translated text}</text>
    </speech>
    <app name="navi">
        <favourites>
            <fav name="..." lat="..." lon="..." subtitle="..."/>
            ...
            <fav name="..." lat="..." lon="..." subtitle="..."/>
        </favourites>
        <screen>
            <ll lat="..." lon="..." />
            <tl lat="..." lon="..." />
            <br lat="..." lon="..." />
        </screen>
    </app>
</yari>
```

In some embodiments, the search application 104 is configured to execute the speech to text recognition locally. Alternatively, the search application 104 may be configured to transmit the first voice command (in a suitable format) to the server 118. Recalling that the server 118 can be implemented as a voice command management server, the server 118 can perform the text to speech recognition and to return the first voice command in a machine-readable format back to the search application 104. Next, the search application 104 is configured to execute a search using the machine-readable format of the voice command.

Effectively, by performing the text to speech recognition and using the so-recognized machine-readable format of the search string, the same effect is obtained as if the user has typed in the search query represented in the first voice command in to the command interface 106 of the search application 104. As has been previously described, the search application 104 is configured to transmit the search query to the search engine server 116 and to receive therefrom search engine results page (SERP) containing a list of one or more web resources that are deemed to be responsive to the search query.

Figure 2:
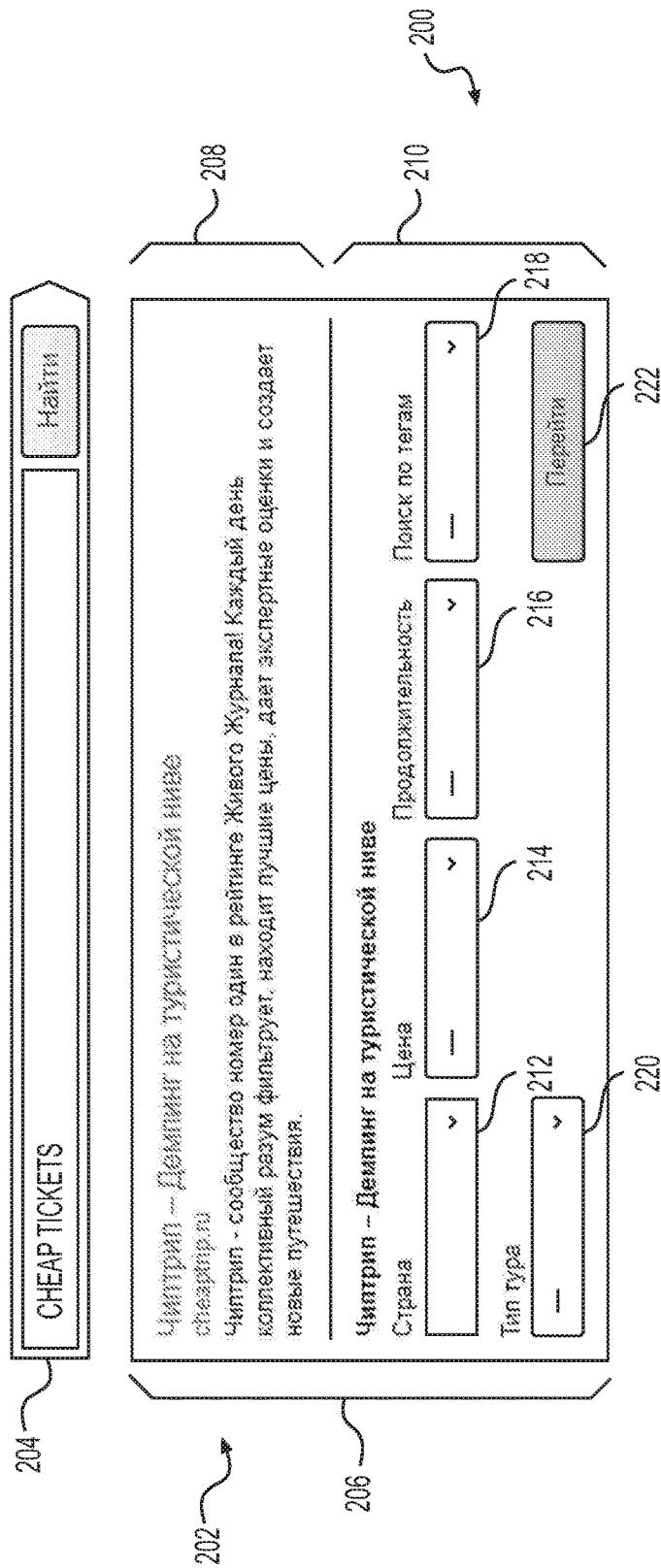
FIG. 2 depicts a screen shot 200 showing a portion of an output of a search application 104 of the system 100 of FIG. 1.

An example of the SERP is depicted in FIG. 2. FIG. 2 depicts a portion of a screen shot 200 of an output of the search application 104. The screen shot has a search query interface 204, which search query interface executes a portion of functionality of the above mentioned command interface 106. More specifically, the search query interface 204 allows the user to input one or more search queries to execute a search. In the depiction of FIG. 2, the search query interface 204 has been pre-populated with the search query that has been received via a voice command, namely "cheap tickets".

The screen shot 200 also has a portion displaying a search engine results page or simply SERP 202. Within the illustration of FIG. 2, only a portion of the search results are displayed, for the sake of simplicity. In reality, the SERP 202 contains several more results responsive to the search query, typically 15-20 (or even more) results per page.

In the depicted embodiments, the at least one result displayed as part of SERP 202 is presented to the user in a form of a widget 206. Within the depicted embodiment, the widget 206 is placed on the first position within the SERP 202, but this does not need be so in every embodiment of the present technology.

A process for generating and presenting search results in a form of a widget (also known as an "interactive snippet field") has been described in greater detail in a co-owned PCT patent application bearing an application number PCT/RU2013/001027, filed with Russian Patent Office as the Receiving Office for PCT on Nov. 15, 2013 and entitled "A METHOD OF PRESENTING INFORMATION ON A SEARCH RESULT PAGE". Content of that application is hereby incorporated by reference in its entirety in those jurisdictions where such incorporation is permitted.

The widget 206 comprises a title block 208. The title block 208 contains general information about the widget 206 and, consequently, information about a web resource associated with the widget 206. Within the specific example being provided herein, the title block 208 contains information about the cheaptrip.ru web site. The title block 208 contains the following description about the resources in Russian, as an example only: Чиптрип демпинг на туристической ниве Cheaptrip.ru Чиптрип сообщество номер один в рейтинге Живого Журнала! Каждый день коллективный разум фильтрует, находит лучшие цены, дает экспертные оценки и создает новые путешествия The above example roughly translates into English as: "Cheaptrips—discounter in the travel industry. Cheaptrip.ru. Cheaptrips—community number one in the rating of the Live Journal! Every day, the collective power of our resource filters the information, finds best prices, provides expert opinions and creates packaged tours".

The widget 206 further comprises a selection portion 210. Generally speaking, the selection portion 210 allows for a two-way interaction between the user and the resource associated with the selection portion 210, via the selection portion 210 without leaving the SERP where the selection portion 210 is displayed. In other words, by interacting with selection portion 210, the user can make selections and receive responses responsive to the selections from the resource associated with the selection portion 210. Alternatively, the user can fill in information using the selection portion 210 and, upon execution a pre-defined action, be transferred to the web resource associated with the selection portion 210, the web resource displaying a response to the query populated using the selection portion 210.

In the specific example being depicted in FIG. 2, the selection portion 210 allows the user to select several parameters associated with a trip (or another travel-related activity) the user is desirous getting information about from the web resource stored on the web server 120 and associated with the widget 206. Within the illustration of FIG. 2, as an example only, the selection portion 210 contains a country selection field 212, the country selection field 212 containing a drop down menu for selection a destination country for a trip the user is interested in. The country selection field 212, in the depicted example, is entitled in Russian "*Страна*" (or "Country" in English). The selection portion 210 further contains a price selection field 214, the price selection field 214 containing a drop down menu for selection a price range (or an exact price) for the trip the user is interested in. The price selection field 214, in the depicted example, is entitled in Russian "*Цена*" (or "Price" in English). Within the various embodiments, the price selection field 214 can contain a drop down menu providing the user a selection of ranges for the trip prices or, alternatively, a data entry field for the user to enter a price range or an exact/maximum price for the trip.

The selection portion 210 further contains a duration selection field 216, the duration selection field 216 containing a drop down menu for selection a duration for a trip the user is interested in. The duration selection field 216, in the depicted example, is entitled in Russian "*Продолжительность*" (or "Duration" in English). Within various embodiments of the present technology, the duration selection field 216 can provide a user a choice of the trip durations, such as "2-3 days", "4-7 days", "7 days", "14 days" and the like.

The selection portion 210 further contains a tag selection field 218, the tag selection field 218 containing a drop down menu for selection a specific tag associated with the trip the user is interested in. The tag selection field 218, in the depicted example, is entitled in Russian "*Поиск по тегам*" (or "Tag-based search" in English). Within the various embodiment, the tag selection field 218 can contain a drop down menu to enable the user to select various potential tags associated with the trip, the tags being used by some of the travel agencies, such as "Luxury", "Get-away", "Kids-friendly", "Adults only" and the like.

The selection portion 210 contains a type selection field 220, the type selection field 220 containing a drop down menu for selection a type of the trip the user is interested in. The type selection field 220, in the depicted example, is entitled in Russian "*Тип тура*" (or "Trip Type" in English). Within some implementations of the present technology, the type selection field 220 can contain a drop down menu to enable the user to select various potential types of the trip, such as for example, "Land Only", "Air+Hotel", "European Plan", "All Inclusive" and the like.

Finally, the selection portion 210 contains a submit button 222, the submit button 222 enabling the user to submit the selections that the user has entered into the various fields of the selection portion 210 (the country selection field 212, the price selection field 214, the duration selection field 216, the tag selection field 218, the type selection field 220) to the web resource stored on the web server 120 and associated with the widget 206. In the depicted example, the submit button 222 is entitled in Russian "*Перейти*" (or "Submit" in English).

In some embodiments of the present technology, responsive to the user actuating the submit button 222, the information the user selected in the selection portion 210 (the country selection field 212, the price selection field 214, the duration selection field 216, the tag selection field 218, the type selection field 220) is transmitted to the web resource stored on the web server 120 and associated with the widget 206. In some implementations, the web resource can transmit data responsive to the information submitted by the user for display within the widget 206 in a dedicated response section (not depicted in FIG. 2). In other implementations, upon the user actuating the submit button 222, the information populated by the user in the selection field 210 is transmitted to the web resource associated with the widget 206 and the user is redirected to the web page associated with the web resource (in the same tab or a different tab), the web page being populated with information responsive to the selections made by the user within the selection field 210.

The user can populate the information within the selection field 210 using conventional techniques, such as using a key board, a mouse, a touch screen and the like. According to embodiments of the present technology, the user can also populate the selection field 210 using voice commands.

Let it now be assumed that the user is desirous of populating the selection field 210 using a voice command. To that extent, the user may issue a voice command containing: "Riviera Maya Mexico, for 1 week, price ranger under $1,000 per person, all inclusive tour in an adults-only resort". The voice interface routine 140 is configured to capture the utterance provided by the user and to transmit it to the search engine server 116. The search engine server 116 can request the server 118 to execute a speech to text translation of the user utterance to obtain machine-readable format of the user request. In alternative embodiments of the present technology, the electronic device 102 can request the server 118 to execute the speech to machine-readable format and to transmit (or have the result transmitted) to the search engine server 116.

Effectively, the search engine server 116 has obtained a second voice command representative of a second search query (without, at this point, appreciating the nature of the second search query). The search engine server 116 is further configured to determine if the second search query is a refinement of the first search query received in the first voice command (or, if it is not, to determine that it is a brand new search query independent of the first search query). In other words, the search engine server 116 determines if the second query is a refinement of the first search query (i.e. search cheap tickets) or if the second query is a brand new query not linked to the first search query.

To that extent, the search engine server 116 is configured to perform two pseudo searches: (i) a first pseudo search based on a combination of the first search query and the second search query; and (ii) a second pseudo search including the second search query alone. The search engine server 116 is then configured to determine a relative weight of the first pseudo search results and the second pseudo search results. In some embodiments of the present technology, the search engine server 116 is configured to determine the relative weight of the first pseudo search results and the second pseudo search results using standard ranking algorithms used for ranking search results. For example, the search engine server 116 can use the standard algorithms that are used for ranking search results while generating the SERP 202. In some embodiments, the search engine server 116 applies a machine-learning algorithm to ranking the totality of the first pseudo search results to the totality of the second pseudo search results.

Next, the search engine server 116 is configured to deduce that the second search query is a refinement of the first search query responsive to the relative weight of the first pseudo search results being higher than that of the second pseudo search results. In other words, if the first pseudo search (having the first search query and the second search query) renders an overall better results set, then the search engine server 116 effectively determines that the second search query is a refinement of the first search query.

The search engine server 116 is then configured to transmit to the electronic device 102 the refined search results (i.e. the first search query results refined with the second search query). In this particular example, the search engine server 116 can be configured to execute a search of the trips available from www.cheaptrips.ru responsive to the following search query: <Destination><Riviera Maya Mexico>, <Duration><1 week>, <Price range><Under $1,000 per person>, <Tag><Adults-only>, <Type><All inclusive>. In some embodiments, the search engine server 116 can transmit the search results obtained using the first pseudo search. In some embodiments of the present technology, rather than transmitting the search results of the first pseudo search or otherwise executing the search, the search engine server 116 can transmit the request to the web server 120, the web server 120 hosting the web resource associated with the widget 206 and the web server 120 can return the appropriate information responsive to the second user query.

In some embodiments of the present technology, the search engine server 116 transmits a set of instructions to the electronic device 102, the set of instructions containing a trigger instrumental in causing the electronic device 102 to execute one or more actions described below. In some embodiments, the set of instructions are embodied in a JSON format. Naturally, any other suitable format can be used.

How the electronic device 102 handles the trigger can be different. Several scenarios are described below.

Scenario 1—Semi Automatic Retrieval of the Refined Search Results

In some embodiments, the electronic device 102, responsive to the receipt of a trigger from the search engine server 116 can populate the respective fields of the selection portion 210 (the country selection field 212, the price selection field 214, the duration selection field 216, the tag selection field 218, the type selection field 220). The user can then review the parameters pre-populated in the selection portion 210 (the country selection field 212, the price selection field 214, the duration selection field 216, the tag selection field 218, the type selection field 220) and, should the user agree with the populated parameters, the user can then activate the submit button 222.

Responsive to the user actuating the submit button and provided that the search engine server 116 has transmitted the refined SERP to the electronic device 102, the electronic device 102 can be configured to either (i) display the results within the widget 206 or (ii) open a new page or a new tab with the web resource stored on the web server 120 and associated with the widget 206, the web resource showing the results responsive to the refined user search.

Alternatively, if the search engine server 116 has not already sent the electronic device 102 the search results responsive to the refined search query, responsive to the user actuating the submit button 222, the electronic device 102 is configured to transmit the request for the search results to the search engine server 116 and, responsive to receiving a response from the search engine server 116 to either (i) display the results within the widget 206 or (ii) open a new page or a new tab with the web resource stored on the web server 120 and associated with the widget 206, the web resource showing the results responsive to the refined user search.

Scenario 2—Automatic Retrieval of the Refined Search Results

In some embodiments, the electronic device 102, provided that the search engine server 116 has transmitted the refined SERP to the electronic device 102, the electronic device 102 can be configured to either (i) display the results within the widget 206 or (ii) open a new page or a new tab with the web resource stored on the web server 120 and associated with the widget 206, the web resource showing the results responsive to the refined user search.

In some embodiments of the present technology, the voice interface routine 140 and the embodiments described herein can also be used to revise the user search query. For example, let's say in the scenario above, rather than showing results for Rivera Maya in Mexico, search results were shown for French Riviera, France. This erroneous result can be due, for example, to errors in translating the user spoken search query into the machine-readable search string. In this scenario, the voice interface routine 140, the server 118 and the search engine server 116 can execute above-described routines in order to execute the following alternative enhancement implementation.

In the above described scenario, the user may produce a third voice command containing the spoken utterance: "No, I will be going to Riviera Maya in Mexico". Responsive to the execution of the above-described routines and determine that this is a refinement to both the first and second search query and present further refined search results to the user.

Needless to say that even though the above examples are focused on the interaction with a travel-booking web site, embodiments of the present technology are not so limited. As such, it should be expressly understood that embodiments of the present technology are applicable to any type of web resources and any type of voice commands.

It is expected that those skilled in the art will be able to execute various components of the system 100 of FIG. 1 without undue experimentation, certain technical details (as examples only) will be provided here. Within the various embodiments of the present technology, the browser (i.e. the search application 104 or any other type of a browser) or a plug in the browser (i.e. a plug in for the search application 104 or any other type of browser or browser add-on) can be configured to implement some of the following routines, these routines being non-limiting examples of how the various algorithms presented herein can be executed.

GetJSON( ) is a routine responsible for serializing the content of the widget 206. SetJSON(json) is a routine responsible for generating the content of the widget 206. UpdateJson(json) is a routine responsible for populating (or updating) the content of the widget 206 by using voice commands, as well as other interfaces (such as keyboards, touchscreens, mouse and the like). Reset( ) is a routine responsible for the resetting of the content of the widget 206. Submit( ) is a routine responsible for transmitting the data populated within the widget 206 to the web resource associated with the widget 206.

Figure 3:
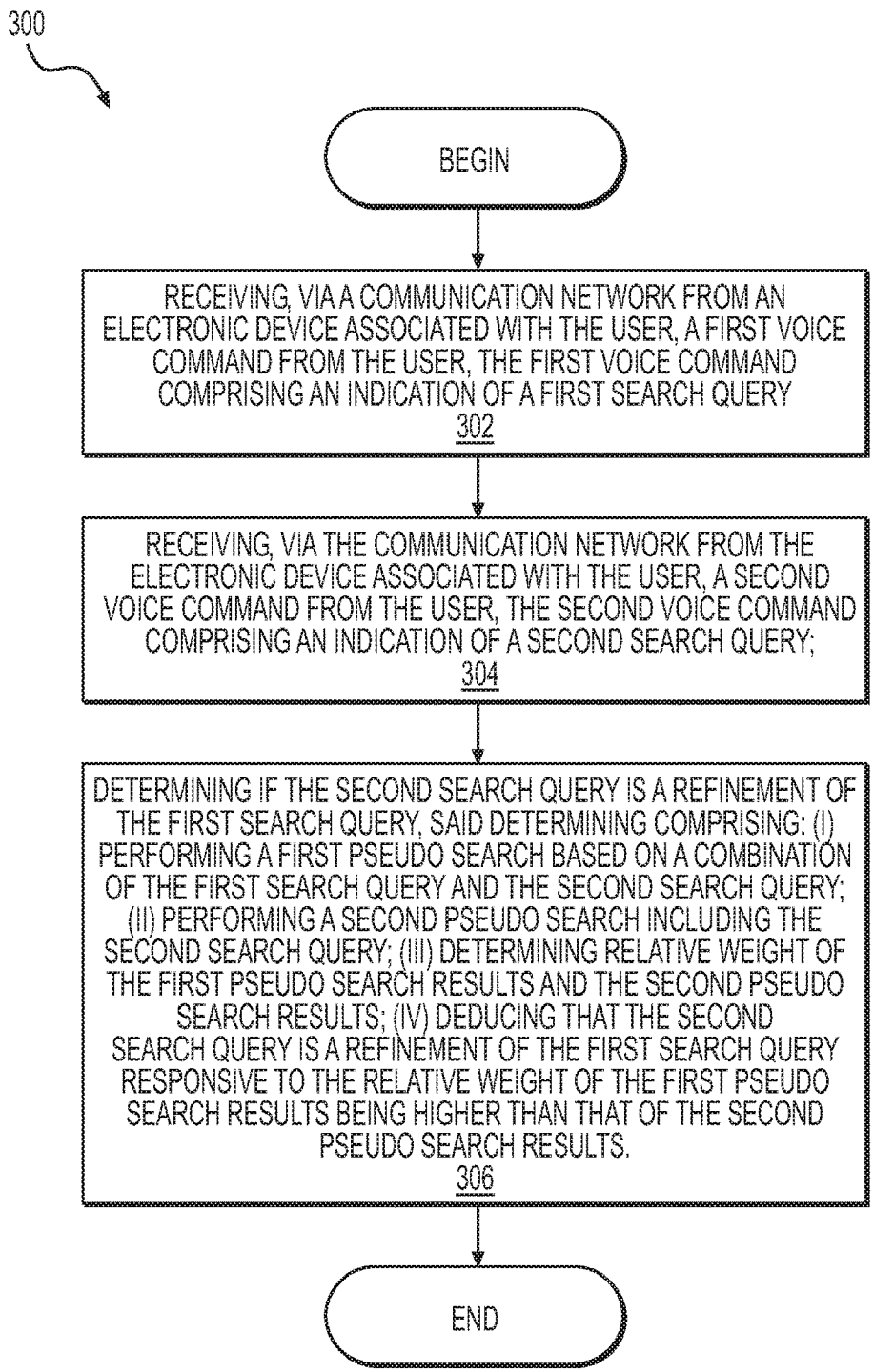
FIG. 3 depicts a flow chart of a method 300 executable at a search engine server of the system 100 of FIG. 1, the method 300 being implemented in accordance with a non-limiting embodiment of the present technology.

Given the architecture of the system 100 described with reference to FIG. 1 and the examples provided with reference to FIG. 2, it is possible to execute a method of processing a search query. With reference to FIG. 3, there is depicted a method 300, the method 300 being implemented in accordance with a non-limiting embodiment of the present technology. Within the embodiments of the present technology, the method 300 can be conveniently executed within the search engine server 116. To that extent, the search engine server 116 comprises non-transient computer readable medium containing computer executable instructions, which instructions when executed are configured to cause the search engine server 116 to execute the steps of the method 300.

Step 302—Receiving, Via a Communication Network from an Electronic Device Associated with the User, a First Voice Command from the User, the First Voice Command Comprising an Indication of a First Search Query The method 300 begins at step 302, where the search engine server 116 receives, via the communication network 114, from the electronic device 102 associated with the user, a first voice command from the user, the first voice command comprising an indication of a first search query.

In some embodiments of the present technology, the search engine server 116 is further configured to translate the first voice command into the computer-readable search string. As has been described above, the search engine server 116 can transmit the first voice command to the server 118 and the server 118 can return to the search engine server 116 the translated first voice command into the machine-readable search string.

How the search engine server 116 generates (or ranks for that matter) the search results is generally known in the art and will not be described here at any length. In some embodiments, the search engine server 116 can transmit search results (i.e. the SERP) to the electronic device. As has been alluded to before, at least one of the search results presented within the SERP can include the widget 206, the widget 206 being associated with a particular web resource.

The method 300 then proceeds to the execution of step 304.

Step 304—Receiving, Via the Communication Network from the Electronic Device Associated with the User, a Second Voice Command from the User, the Second Voice Command Comprising an Indication of a Second Search Query Next, at step 304, the search engine server 116 receives, via the communication network 114 from the electronic device 102 associated with the user, a second voice command from the user, the second voice command comprising an indication of a second search query.

In some embodiments of the present technology, the search engine server 116 is further configured to translate the second voice command into the computer-readable search string. As has been described above, the search engine server 116 can transmit the second voice command to the server 118 and the server 118 can return to the search engine server 116 the translated second voice command into the machine-readable search string.

The method 300 then proceeds to execution of step 306.

Step 306—Determining if the Second Search Query is a Refinement of the First Search Query Next, at step 306, the search engine server 116 determines if the second search query is a refinement of the first search query. In some embodiments, in order to determine if the second search query is a refinement of the first search query, the search engine server 116 is configured to execute the following steps.

The search engine server 116 first performs a first pseudo search based on a combination of the first search query and the second search query. The search engine server 116 then performs a second pseudo search including the second search query. Needless to say, the order of the performing the first pseudo search and the second pseudo search can be reversed.

Next, the search engine server 116 determines a relative weight of the first pseudo search results and the second pseudo search results. In some embodiments of the present technology, the search engine server 116 is configured to determine the relative weight of the first pseudo search results and the second pseudo search results using standard ranking algorithms for ranking search results. In some embodiments, the search engine server 116 applies a machine-learning algorithm to ranking the totality of the first pseudo search results to the totality of the second pseudo search results.

Then, the search engine server 116 is configured to deduce that the second search query is a refinement of the first search query responsive to the relative weight of the first pseudo search results being higher than that of the second pseudo search results.

In some embodiments of the method 300, the search engine server 116 is further configured, responsive to receiving the first voice command, to perform a search based on the first search query and transmitting, via the communication network 114, a SERP responsive to the first search query to the electronic device 102 associated with the user. In some implementations, the search engine server 116 can transmit an instruction to the electronic device 102, the instruction being instrumental for causing the electronic device 102 to display the widget 206 associated with at least one search result within the SERP (as is depicted in FIG. 2, for example).

In some embodiments of the method 300, the widget 206 comprises at least one interactive element (such as the above described the selection portion 210: the type selection field 220, the country selection field 212, the price selection field 214, the duration selection field 216, the tag selection field 218, the type selection field 220) for establishing a two-way communication between the widget being displayed on the electronic device and a resource associated with the at least one search result. An example of the selection portion 210 has been discussed at length above, as well as user interaction with the selection portion 210.

In some implementations of the method 300, the search engine server 116 is further configured, responsive to deducing that the second search query is a refinement of the first search query, to transmit a trigger to the electronic device 102, the trigger being instrumental in causing the electronic device 102 to update at least one interactive element (i.e. the selection portion 210) with at least a portion of the second search query. For example, the trigger can be instrumental in causing the electronic device 102 to update some or all of the selection portion 210 (the country selection field 212, the price selection field 214, the duration selection field 216, the tag selection field 218, the type selection field 220).

In some implementations, the trigger can be further instrumental in causing the electronic device 102 to update a portion of the widget 206 with information responsive to the combined search including the first search query and the second search query.

In some implementations of the method 300, the search engine server 116 is further configured, responsive to deducing that the second search query is a refinement of the first search query, to transmit to the electronic device 102, via the communication network 114, an updated SERP, the updated SERP being responsive to the first pseudo search.

Execution of the method 300 then terminates.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:
1. A method of processing a search query, the method executable at a server, the method comprising:
   receiving, via a communication network from an electronic device associated with the user, a first voice command from the user, the first voice command comprising an indication of a first search query;
   receiving, via the communication network from the electronic device associated with the user, a second voice command from the user, the second voice command comprising an indication of a second search query;
   determining if the second search query is a refinement of the first search query, said determining comprising:
      performing a first pseudo search based on a combination of the first search query and the second search query;
      performing a second pseudo search including the second search query alone;
      determining relative weight of the first pseudo search results and the second pseudo search results;
      deducing that;
         (i) the second search query is a refinement of the first search query responsive to the relative weight of the first pseudo search results being higher than that of the second pseudo search results;
         (ii) the second search query is a brand new query independent of the first search query responsive to the relative weight of the first pseudo search results being lower than that of the second pseudo search results.

2. The method of claim 1, further comprising responsive to receiving the first voice command, performing a search based on the first search query and transmitting, via the communication network, a SERP responsive to the first search query to the electronic device associated with the user.

3. The method of claim 2, wherein said transmitting comprising transmitting an instruction to the electronic device, the instruction being instrumental for causing the electronic device to display a widget associated with at least one search result within the SERP.

4. The method of claim 3, wherein the widget comprises at least one interactive element for establishing a two-way communication between the widget being displayed on the electronic device and a resource associated with the at least one search result.

5. The method of claim 4, wherein the second search query is based on at least a portion of the at least one interactive element.

6. The method of claim 4, wherein the second search query is for populating at least a portion of the at least one interactive element.

7. The method of claim 4, wherein responsive to deducing that the second search query is a refinement of the first search query, the method further comprises transmitting a trigger to the electronic device, the trigger being instrumental in causing the electronic device to update at least one interactive element with at least a portion of the second search query.

8. The method of claim 7, the trigger being further instrumental in causing the electronic device to update a portion of the widget with information responsive to the combined search including the first search query and the second search query.

9. The method of claim 7, the trigger being further instrumental in causing the electronic device to update a portion of the widget with information responsive to the combined search including the first search query and the second search query, upon user providing an instruction to do so.

10. The method of claim 7, the trigger being further instrumental in causing the electronic device to present the user a web site associated with the resource associated with the at least one search result, the resource being updated with information responsive to the combined search including the first search query and the second search query.

11. The method of claim 7, the trigger being further instrumental in causing the electronic device to present the user a web site associated with the resource associated with the at least one search result, the resource being updated with information responsive to the combined search including the first search query and the second search query, upon user providing an instruction to do so.

12. The method of claim 2, wherein responsive to deducing that the second search query is a refinement of the first search query, the method further comprising transmitting to the electronic device, via the communication network, an updated SERP, the updated SERP being responsive to the first pseudo search.

13. The method of claim 12, wherein the method further comprises transmitting to the electronic device a trigger instrumental in causing the communication device to only display the updated SERP in response to receiving an instruction from the user to do so.

14. The method of claim 1, wherein said receiving of the first voice command is executed upon user providing to the electronic device a voice command interface activation command.

15. The method of claim 1, wherein the method further comprises receiving, via the communication network from the electronic device associated with the user, a third voice command from the user, the third voice command comprising an indication of a third search query; and the method further comprising deducing if the third search query is a refinement of the first search query and the second search query.

16. The method of claim 1, wherein said determining if the second search query is a refinement of the first search query comprises applying a ranking algorithm.

17. The method of claim 16, wherein said ranking algorithm is a machine-learning algorithm used for ranking search results for generating a SERP.

18. A server for processing a search query, the server comprising:
   a network communication interface for a two-way communication over a communication network;
   a processor coupled to the network communication interface, the processor being configured to:
      receive, via the network communication interface from an electronic device associated with the user, a first voice command from the user, the first voice command comprising an indication of a first search query;
      receive, via the network communication interface from the electronic device associated with the user, a second voice command from the user, the second voice command comprising an indication of a second search query;
      determine if the second search query is a refinement of the first search query by executing the steps of:

performing a first pseudo search based on a combination of the first search query and the second search query;

performing a second pseudo search including the second search query alone;

determining relative weight of the first pseudo search results and the second pseudo search results;

deducing that:
(i) the second search query is a refinement of the first search query responsive to the relative weight of the first pseudo search results being higher than that of the second pseudo search results;
(ii) the second search query is a brand new query independent of the first search query responsive to the relative weight of the first pseudo search results being lower than that of the second pseudo search results.

19. The server of claim 18, wherein the processor is further configured, responsive to the receipt of the first voice command, to perform a search based on the first search query and to transmit, via the network communication interface, a SERP responsive to the first search query to the electronic device associated with the user.

20. A non-transient computer readable medium comprising computer executable instructions, which instructions when executed are configured to cause a processor of a server to execute:

receiving, via a communication network from an electronic device associated with the user, a first voice command from the user, the first voice command comprising an indication of a first search query;

receiving, via the communication network from the electronic device associated with the user, a second voice command from the user, the second voice command comprising an indication of a second search query;

determining if the second search query is a refinement of the first search query, said determining comprising:
  performing a first pseudo search based on a combination of the first search query and the second search query;
  performing a second pseudo search including the second search query alone;
  determining relative weight of the first pseudo search results and the second pseudo search results;
  deducing that:
  (i) the second search query is a refinement of the first search query responsive to the relative weight of the first pseudo search results being higher than that of the second pseudo search results;
  (ii) the second search query is a brand new query independent of the first search query responsive to the relative weight of the first pseudo search results being lower than that of the second pseudo search results.

* * * * *